US012636232B2

(12) United States Patent
Kamping et al.

(10) Patent No.: US 12,636,232 B2
(45) Date of Patent: May 26, 2026

(54) TEAT FOR USE WITH A CONTAINER FOR CONTAINING LIQUID

(71) Applicant: KONINKLIJKE PHILIPS N.V., Eindhoven (NL)

(72) Inventors: Wiecher Ferdinand Kamping, Esch (NL); Johannes Tseard Van Der Kooi, Munein (NL); Christoph Dobrusskin, Nuenen (NL); Sietse De Vries, Eindhoven (NL); Daan Hendrik Gosenshuis, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 102 days.

(21) Appl. No.: 17/424,209

(22) PCT Filed: Jan. 21, 2020

(86) PCT No.: PCT/EP2020/051316
§ 371 (c)(1),
(2) Date: Jul. 20, 2021

(87) PCT Pub. No.: WO2020/156863
PCT Pub. Date: Aug. 6, 2020

(65) Prior Publication Data
US 2022/0110834 A1 Apr. 14, 2022

(30) Foreign Application Priority Data
Feb. 1, 2019 (EP) .................................... 19155016

(51) Int. Cl.
*A61J 11/00* (2006.01)

(52) U.S. Cl.
CPC ............ *A61J 11/002* (2013.01); *A61J 11/001* (2013.01); *A61J 11/0015* (2013.01)

(58) Field of Classification Search
CPC ...... A61J 11/002; A61J 11/0015; A61J 11/001
See application file for complete search history.

(56) References Cited

U.S. PATENT DOCUMENTS 2,223,179 A 11/1940 Lougheed
4,993,568 A * 2/1991 Morifuji ................ A61J 11/002 215/11.4

(Continued)

FOREIGN PATENT DOCUMENTS

EP 0496892 A1 8/1992
EP 2695549 A2 2/2014

(Continued)

OTHER PUBLICATIONS

International Search Report and Written Opinion, International Application No. PCT/EP2020/051316, Mailed on Feb. 25, 2020.

*Primary Examiner* — Nathan J Jenness
*Assistant Examiner* — Jennifer Castriotta

(57) ABSTRACT

A teat (1) comprises a hollow teat body (10) including a deformable hollow mouthpiece (11) and a normally-closed valve (30) arranged at a level of the mouthpiece (11) or a level more downstream, the valve (30) being openable under the influence of suction forces exerted to the mouthpiece (11) by a user of the teat (1) during a liquid intake action. The valve (30) is included in a valve area (32) of a valve body (31) that is configured and arranged to prevent a closed-opened condition of the valve (30) from being changed under the influence of deformation of the mouthpiece (11) inflicted by a user of the teat (1) during a liquid intake action, so that the closed-opened condition of the valve (30) is controllable by means of suction forces exerted to the mouthpiece (11) by a user of the teat (1) during a liquid intake action.

15 Claims, 3 Drawing Sheets

(56) References Cited

U.S. PATENT DOCUMENTS

| | | | |
|---|---|---|---|
| 5,035,340 A | 7/1991 | Timmons | |
| 5,101,991 A | 4/1992 | Morifuji et al. | |
| 5,553,726 A * | 9/1996 | Park | A61J 11/0005 215/11.4 |
| 5,607,073 A * | 3/1997 | Forrer | A47G 19/2272 220/717 |
| 6,112,919 A | 9/2000 | Ho | |
| 6,343,704 B1 | 2/2002 | Prentiss | |
| 6,994,225 B2 * | 2/2006 | Hakim | A61J 11/0035 215/11.4 |
| 9,326,916 B2 * | 5/2016 | Tollman | A47G 19/2272 |
| 2004/0220618 A1 * | 11/2004 | Rohrig | A61J 11/005 606/234 |
| 2012/0074090 A1 * | 3/2012 | Rees | A61J 11/0065 215/11.1 |

FOREIGN PATENT DOCUMENTS

| | | | |
|---|---|---|---|
| GB | 2226014 | A | 6/1990 |
| JP | 2008005995 | A | 1/2008 |
| WO | 1997031610 | A1 | 9/1997 |
| WO | 2004013001 | A2 | 2/2004 |
| WO | 2004013001 | A3 | 4/2005 |

* cited by examiner

TEAT FOR USE WITH A CONTAINER FOR CONTAINING LIQUID

This application is the U.S. National Phase application under 35 U.S.C. § 371 of International Application No. PCT/EP2020/051316, filed on 21 Jan. 2020, which claims the benefit of European Application Serial No. 19155016.9, filed on 1 Feb. 2019. These applications are hereby incorporated by reference herein.

FIELD OF THE INVENTION

The invention relates to a teat for use with a container for containing liquid, comprising a hollow teat body including a deformable hollow mouthpiece for a user of the teat to suck on during a liquid intake action for the purpose of displacing liquid in a downstream direction through the teat body and out of the teat through the mouthpiece. The invention also relates to an assembly comprising a teat as mentioned and a container for containing liquid. Such an assembly may be a feeding bottle assembly comprising a feeding bottle for containing a feeding liquid such as milk, for example.

BACKGROUND OF THE INVENTION

A teat as defined in the foregoing is generally known and is generally applied in the field of bottle feeding. An important issue in the field of bottle feeding is the desire to mimic natural breast feeding as well as possible. A first advantage of doing so is that a bottle-fed infant is allowed to perform a liquid intake action in a familiar way, without the occurrence of unexpected effects. A second advantage of doing so is that a bottle-fed infant is enabled to maintain the capability to feed on the breast, which capability may be hindered when bottle feeding does not stimulate certain natural reflexes in the infant. When bottle feeding and breast feeding differ too much, there is a considerable risk that the infant gets confused.

For the purpose of taking in milk from a breast, an infant applies two cooperating/interacting mechanisms. A first mechanism is sucking. Negative pressure created by sucking helps the infant to form a teat from the nipple, areola, and underlying breast tissue. Further, an infant may maintain a base underpressure for the purpose of keeping the teat in the mouth. In any case, an alternating pressure is applied, which contributes to the actual process of retrieving milk from the breast and causing the milk to flow into the infant's mouth. A second mechanism is the so-called peristaltic tongue movement. During a liquid intake action, an infant performs a peristaltic movement with the tongue. In the process, a wave moving from the tip of the tongue to the back is created. The peristaltic tongue movement has different functions, including transportation of milk and extraction of milk at the exit of the teat. In respect of the transportation of milk, it is noted that in the valley of the wave, milk is transported from the base of the teat to the top of the teat where exit holes are present, while the hill of the wave helps to push the milk. In respect of the extraction of milk, it is noted that the valley of the wave creates an increase in volume at the position of the top of the teat, so that underpressure is obtained. At the same time, the hill of the wave pushes the milk towards the exit.

Many artificial teats are of such a design that liquid is always allowed to flow whenever there is a pressure difference. For example, teats may be of a very simple design, being provided with just one or more small liquid outlet holes that are always open, or, if some kind of measure for realizing a closed condition of one or more liquid outlet holes as a default is taken, it may be so that the closed condition of the one or more liquid outlet holes can easily be changed to an opened condition as soon as the teat is used. In view thereof, when a generally known teat is used, a liquid intake action can easily be disrupted by causing choking, gagging, spitting, etc. For instance, any base underpressure exerted by an infant will also result in a flow of liquid. As this is not the case in breast feeding, this is not expected by the infant. As a result, the infant experiences discomfort and the chance on ingesting air is increased.

SUMMARY OF THE INVENTION

It is an object of the invention to provide a teat that is designed to be closed by default and that is functional in using said feature for realizing a feeding process that has similarities to a breast feeding process.

In view of the foregoing, the invention provides a teat that comprises a hollow teat body including a deformable hollow mouthpiece for a user of the teat to suck on during a liquid intake action for the purpose of displacing liquid in a downstream direction through the teat body and out of the teat through the mouthpiece, as defined earlier, and that further comprises a normally-closed valve arranged at a level of the mouthpiece or a level that is further downstream, the valve being openable under the influence of suction forces exerted to the mouthpiece by a user of the teat during a liquid intake action, and the valve being included in a valve area of a valve body that is configured and arranged to prevent a closed-opened condition of the valve from being changed under the influence of deformation of the mouthpiece inflicted by a user of the teat during a liquid intake action.

Having a normally-closed valve in the mouthpiece helps in avoiding a situation in which a flow of liquid from the teat is always obtained as soon as underpressure is exerted to the mouthpiece. However, there is more to the invention, namely the fact that the valve is included in a valve area of a valve body that is configured and arranged to prevent a closed-opened condition of the valve from being changed under the influence of deformation of the mouthpiece inflicted by a user of the teat during a liquid intake action. This feature of the invention is related to the insight that the intended functionality of the valve could be disrupted under the influence of compression forces exerted to the mouthpiece by a user of the teat during a liquid intake action. By making appropriate choices in respect of factors such as positioning, dimensioning and mechanical properties of the valve body, it is possible to design the teat in such a way that a closed-opened condition of the valve is only or at least mainly determined by an extent to which underpressure is exerted to the mouthpiece during a liquid intake action. As an advantageous consequence, a situation in which the normally-closed valve is unexpectedly opened under the influence of compression forces from the mouth, particularly the tongue, is avoided. Instead, there is a direct relation between the closed-opened condition of the valve and the sucking mechanism that is not disturbed by the peristaltic tongue movement mechanism, which contributes to a high level of convenience of a liquid intake action.

In the Following, for the sake of clarity, deformation of the mouthpiece inflicted by a user of the teat during a liquid intake action will be referred to as operational deformation of the mouthpiece. Likewise, compression forces exerted to the mouthpiece by a user of the teat to the mouthpiece during a liquid intake action will be referred to as operational compression forces.

It is noted that the valve body may particularly be configured and arranged to prevent direct deforming influence of operational compression forces on the valve area. Among other things, in case the valve area is located inside the mouthpiece, this may be realized by choosing such positioning and dimensioning of the valve body that a situation in which compression of the mouthpiece would result in the mouthpiece pressing on the valve body in such a way that the valve is put from a closed condition to an opened condition cannot occur under normal circumstances during a liquid intake action. A practical factor in this respect may be to have space between the valve body and an inside surface of the mouthpiece at the level of the valve area.

The user of the teat according to the invention may be an infant. Measurement results obtained in the field of bottle feeding show that total and maximal compression of a mouthpiece of a teat that is used for feeding an infant may be about 6 mm. Hence, for the purpose of preventing a valve body as may be present inside the mouthpiece from being directly compressed, it may be advantageous it a radial distance between at least a portion of the valve body and the inside surface of the mouthpiece is chosen to be at least 3 mm at the level of the valve area.

Another or an additional way of preventing a closed-opened condition of the valve from being changed under the influence of operational deformation of the mouthpiece involves preventing or at least hindering transmittal of operational compression forces from the mouthpiece to the valve body. For example, in case the valve body comprises a transitional area and is connected to the mouthpiece through the transitional area, the transitional area may be configured to prevent or at least hinder transmittal of the compression forces from the mouthpiece to the valve body. Also, the valve body may be configured to prevent or at least hinder transmittal of the compression forces from a part of the valve body outside of the valve area to the valve area. In the first case, it may be practical for the valve body to have a stiffness that is different from a stillness of the mouthpiece, at least at the position of the transitional area of the valve body, i.e. at the position where the valve body is connected to the mouthpiece. In the second case, it may be practical for the valve body to comprise at least two portions of different stiffness, one of the portions including the valve area. In general, having at least two portions of different stiffness involves a mechanical isolation effect without needing to take complex measures. For example, stiffness differences can be realized by choosing different materials, choosing different wall thicknesses and/or providing one of the portions with reinforcing ribs or the like.

In a practical embodiment of the teat according to the invention, the valve is located at a level of a top end of the mouthpiece or a level that is further upstream, the furthest possible upstream level being the level of a bottom end of the mouthpiece. An advantage of such an embodiment is that the exterior appearance of the teat does not deviate from the exterior appearance of an average teat. Thus, on the outside, the teat appears to be what is perceived by the average user as normal, while the valve and the valve body are flush with a top outline of the mouthpiece or can only be seen at the inside of the teat. The experience of an infant taking in liquid through the teat according to the invention in that case is not any different than what is common in the field of bottle feeding as far as tactile aspects are concerned. It may particularly be so that the valve body extends in an upstream direction in the mouthpiece from the top end thereof.

Besides the option of having the valve at a level of a top end of the mouthpiece or a level that is further upstream, which implies that the valve may be at a position inside the mouthpiece, the invention also covers the option of having the valve at a level that is further downstream than the level of the top end of the mouthpiece. Realizing such an option may involve providing a valve body that projects from the top end of the mouthpiece, outside of the mouthpiece.

For the purpose of letting out liquid to a user's mouth, it is common for a teat body to be provided with one or more apertures at an appropriate position, which is a position at the top end of the mouthpiece in many known cases. In the framework of the invention, it may be so that the valve serves as the one or more apertures, but it is also possible that one or more apertures are present in the top end of the mouthpiece and the valve is arranged at a level that is further upstream, at a position for being in fluid communication with the one or more apertures.

Preferably, the mouthpiece and the valve body constitute an integral entirety. In the first place, this involves simplicity of design and manufacture. In the second place, the risk that a component unintentionally detaches from the teat is eliminated.

Within the framework of the invention, the valve can be of any suitable design. The valve does not need to be complex as it may suffice for the valve to comprise one or more holes in the valve area, which are sufficiently small so as to prevent passage of liquid as long as the liquid is not subjected to a pressure difference higher than a crack pressure associated with the surface tension of the liquid. According to another option, it is practical for the valve to comprise a slit. Such a slit may be shaped as a straight line, a Y, a +, or may have any other appropriate shape. More than one slit may be provided, although the option of having only one slit is advantageous in that simplicity of design and manufacture is promoted.

In a possible case of the valve body being hollow and extending in an upstream direction in the mouthpiece from a top end thereof, it is advantageous if the valve body has a smaller volume than the mouthpiece and only reaches to a minimum extent into the mouthpiece. In particular, in such a case, it is advantageous if a volume of the valve body is smaller than 0.1 ml, i.e. smaller than a volume that is associated with a single sip as can be taken by a small infant. By only having a relatively small valve body in the configuration as mentioned, dead volume associated with such a configuration is minimized, so that a user of the teat practically does not need to exert suction forces at a level higher than normal. Also, the teat is easier to clean and liquid at the outside of the mouthpiece is minimized.

In a practical embodiment of the teat according to the invention, the valve body is generally cup-shaped and has a bottom and a wall portion, wherein the valve body extends in an upstream direction in the mouthpiece from a top end thereof, the bottom of the valve body being located at a most upstream level in the mouthpiece and the valve being located in the bottom. Within the framework of the invention, various tests have been performed and calculations have been made in order to define useful relations between various values of a teat according to such an embodiment, assuming that the wall portion of the valve body is generally tube-shaped so that an inside diameter/radius and an outside diameter/radius of the wall portion can be defined, and assuming use of the teat for feeding an infant and the general dimensioning associated therewith. Among other things, the following relations have been found to be relevant when it comes to ensuring that the condition of the valve can only be changed under the influence of sucking forces associated with normal use of the teat, a possible influence of operational deformation of the mouthpiece, i.e. deformation of the mouthpiece associated with normal use of the teat, being eliminated to a sufficient extent: 1) along at least a portion of the valve body, a total of i) an outside radius of the wall portion of the valve body and ii) 1.7 times a wall thickness of the mouthpiece at the level where the outside radius of the valve body is considered is smaller than 4 mm, 2) a ratio between i) an outside radius of the wall portion of the valve body and ii) an inside radius of the mouthpiece at the level of the valve is smaller than 0.54, and 3) a ratio between i) a length of the valve body and ii) an outside diameter of the wall portion of the valve body is larger than 0.5, preferably larger than 0.7.

In respect of the use of the terms “diameter” and “radius” in the present text, it is noted that such terms are to be understood so as to refer to dimensions in a direction that is generally radial with respect to a longitudinal direction of the object of which the dimensions are defined. Hence, the terms are to be understood in a considerably broader sense than a sense of being intrinsically related to a generally circular shape, and are also applicable to other shapes, including non-symmetrical shapes.

It may be practical if at least a top portion of the mouthpiece has a cross-section of generally circular shape, as this allows for position-independent use of the teat, but this is not essential within the framework of the invention. For example, the cross-section of at least a top portion of the mouthpiece may as well be of generally oval shape with a long axis and a short axis. The valve body may be of any suitable design, including the designs referred to in the foregoing. An example of an appropriate shape is a cup shape, as mentioned, wherein it may be practical for the wall portion of the cup-shaped valve body to be generally tube-shaped. In such a case, the wall portion of the valve body may have any appropriate cross-sectional shape, including a generally circular shape. Other examples of an appropriate shape of the valve body include a ball shape, a cone shape and a flat tube shape. The valve and the valve area may have any suitable position in the valve body, including a position at a most downstream level. For example, in the case of the cup-shaped valve body having a bottom and a wall portion, the valve may be located in the bottom as suggested earlier, but it is also possible for the valve to be located in the wall portion of the valve body. The valve body may have a central position in/on the mouthpiece, but an off-center position is also possible. Further, the valve body may extend generally parallel to a longitudinal axis of the mouthpiece, but that does not alter the fact that an orientation of the valve body in which the valve body is inclined with respect to the longitudinal axis of the mouthpiece is also feasible.

The invention relates to a teat according to the definitions provided in the foregoing, and further to an assembly comprising such a teat and a container for containing liquid.

The above-described and other aspects of the invention will be apparent from and elucidated with reference to the following detailed description of a teat that comprises a hollow teat body including a deformable hollow mouthpiece, and a valve body including a normally-closed valve located in the mouthpiece.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
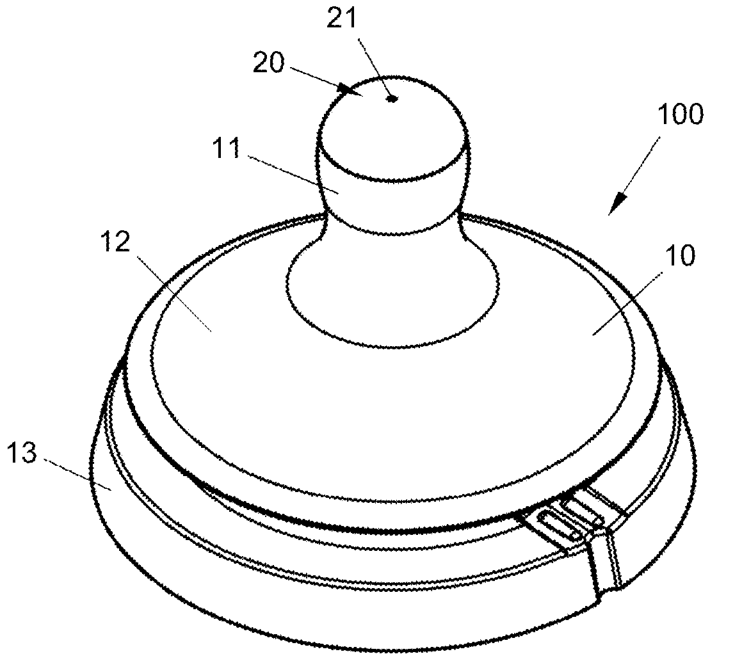
FIG. 1 diagrammatically shows a perspective view of the outside appearance of a teat body of a commonly known teat.

FIG. 1 relates to a commonly known teat, and FIGS. 2-5 relate to a teat according to the invention. The features of the commonly known teat as will be discussed in the following are equally applicable to the teat according to the invention, at least to the embodiments shown, unless otherwise indicated.

In general, the teat 100 is intended to be connected to a container (not shown) which is suitable for containing an amount of liquid to be supplied to a user, which may particularly be an infant although other types of user are not excluded in the context of the invention. Such a container may be of any design and type. For example, the teat 100 may be used in combination with a feeding bottle that is provided with external screw thread at an open side thereof and a connecting ring that is provided with internal screw thread, in which case a portion of the teat 100 can be retained between the connecting ring and the bottle in an interconnected condition of the connecting ring and the bottle that is realized by engagement of the respective screw threads.

With reference to FIG. 1, it is noted that the teat 100 has at least one aperture 21 for letting out liquid from the teat 100. The at least one aperture 21 can be of any suitable shape and size. Terms such as top and bottom as used in relation to the teat 100 are to be understood so as to be related to a normal flow of liquid through the teat 100, as intended to be supplied to a user of the teat 100, i.e. a flow of liquid in a direction towards to the at least one aperture 21, wherein such direction is logically defined as a downstream direction, wherein an opposite direction is an upstream direction, and wherein “top” is an indication of a level/position that is further downstream, while “bottom” is an indication of a level/position that is further upstream.

The teat 100 comprises a teat body 10 that is hollow and flexible, and basically has two portions, namely a mouthpiece 11 and a main body 12. The mouthpiece 11 extends from the main body 12, the mouthpiece 11 comprising the at least one aperture 21 as mentioned earlier, in a liquid outlet area 20 at a top end thereof, and the main body 12 comprising a flange-like portion 13 at a bottom end thereof. The main body 12 is integrally formed on the mouthpiece 11 and widens relative to the mouthpiece 11. The mouthpiece 11 constitutes a nipple-like portion of the teat body 10, being a portion of the teat body 10 that is intended to be inserted into the mouth of a user of the teat 100.

The invention is at the position of the mouthpiece 11, which is deformable under the influence of operational compression forces, i.e. compression forces exerted to the mouthpiece 11 by a user of the teat 100 during a liquid intake action, and which is hollow, as explained in the foregoing. The invention is independent of the features of the main body 12. In general, the invention is independent of whatever design any possible other portion of the teat body 10 than the mouthpiece 11 may have.

Figure 2:
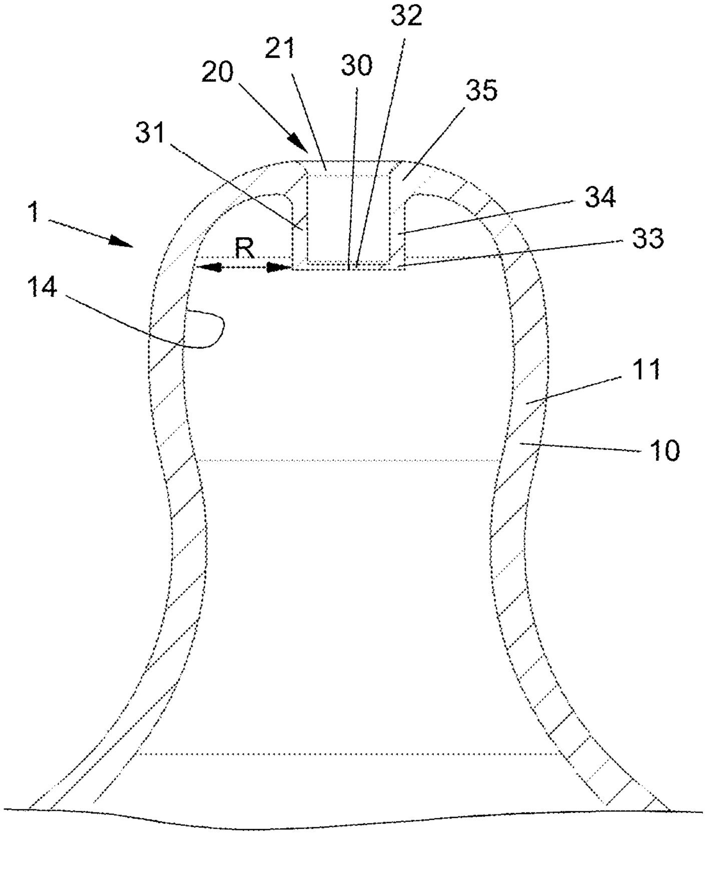
FIG. 2 diagrammatically shows a sectional view of a mouthpiece of a teat body of a teat according to a practical embodiment of the invention.

With reference to FIG. 2, particulars of a teat 1 according to a practical embodiment of the invention will now be described. It is noted that in FIG. 2, only the mouthpiece 11 of the teat body 10 of the teat 1 is shown. In the mouthpiece 11, a normally-closed valve 30 is present. In the shown example, the normally-closed valve 30 is at a recessed position with respect to the top end of the mouthpiece 11. This position of the normally-closed valve 30 is realized on the basis of the fact that the teat 1 comprises a cup-shaped valve body 31 that is integral with the mouthpiece 11 and that extends in an upstream direction in the mouthpiece 11, thereby constituting a recess in the mouthpiece 11, the normally-closed valve 30 being arranged in a valve area 32 of the cup-shaped valve body 31 that is located at a bottom 33 of the cup-shaped valve body 31 having a most upstream position. As can be seen in FIG. 2, the normally-closed valve 30 does not need to be of complex design, but may instead comprise a single slit of linear shape in the bottom 33 of the cup-shaped valve body 31. That does not alter the fact that other embodiments of the normally-closed valve 30 are possible within the framework of the invention.

In the configuration as illustrated in FIG. 2 and as described in the foregoing, when the normally-closed valve 30 is in an opened condition, it is possible for liquid to reach the top end of the mouthpiece 11 and be released from the teat 1 at that position. When the mouthpiece 11 of the teat 1 according to the practical embodiment of the invention is compared to the mouthpiece 11 of the commonly known teat 100, it is found that the teat 1 according to the practical embodiment of the invention comprises a recess in the mouthpiece 11, that a normally-closed valve 30 is arranged in a bottom of the recess, and that the liquid outlet area 20 comprises the at least one aperture 21, which in this case is a single aperture, constituted by an open top side of the recess. A reason for having a normally-closed valve 30 in the teat 1 is a desire to avoid a situation in which liquid can be retrieved through the teat 1 in all circumstances in which underpressure is exerted at the outside of the teat 1 and to thereby offer an option to better mimic a natural breast feeding process. A reason for having the normally-closed valve 30 in a cup-shaped valve body 31 is a desire to avoid a situation in which the normally-closed valve 30 is under direct deforming influence of operational compression forces and to thereby guarantee that having a sufficient level of underpressure at the outside of the teat 1 can actually be taken as a requirement for realizing an opened condition of the normally-closed valve 30. According to the invention, this is achieved by having the normally-closed valve 30 in the cup-shaped valve body 31 that is configured and arranged to prevent a closed-opened condition of the valve from being changed under the influence of operational deformation, i.e. deformation of the mouthpiece 11 inflicted by a user during a liquid intake action.

Within the framework of the invention, the cup-shaped valve body 31 can be of any suitable design. As mentioned, in the shown example, the cup-shaped valve body 31 is cup-shaped and is arranged so as to extend inwardly in the mouthpiece 11. The bottom 33 of the cup-shaped valve body 31 has the most upstream position and the cup-shaped valve body 31 is open to the top end of the mouthpiece 11. One way of preventing or at least hindering transmittal of operational compression forces from the mouthpiece 11 to the valve body 3 such that the compression forces cannot cause a change in the closed-opened condition of the normally-closed valve 30 involves having stiffness differences at appropriate positions in the cup-shaped valve body 31. For example, a top section of a wall portion 34 of the cup-shaped valve body 31 constituting a transitional area 35 through which the cup-shaped valve body 31 is connected to the mouthpiece 11 may have a different stiffness than the remainder of the cup-shaped valve body 31. When the wall portion 34 of the cup-shaped valve body 31 connects to the mouthpiece 11 through a relatively weak transitional area 35, or when the wall portion 34 of the cup-shaped valve body 31 connects to the mouthpiece 11 through a relatively strong transitional area 35, it is achieved that deforming forces prevailing in the mouthpiece 11 during a liquid intake action are not transferred to the remainder of the cup-shaped valve body 31, or at most only to a very small extent that is insufficient to put the normally-closed valve 30 from the closed condition to the opened condition. It is also possible for the bottom 33 and the wall portion 34 of the body of the normally-closed valve 30 to be of different stiffness, for example.

Figure 3:
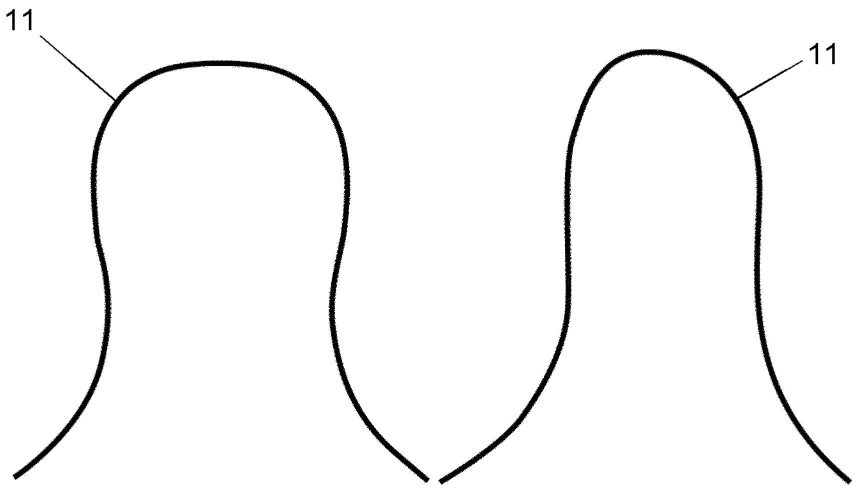
FIG. 3 illustrates how the mouthpiece is deformed under the influence of compression forces exerted to the mouthpiece by a user of the teat during a liquid intake action.
Figure 4:
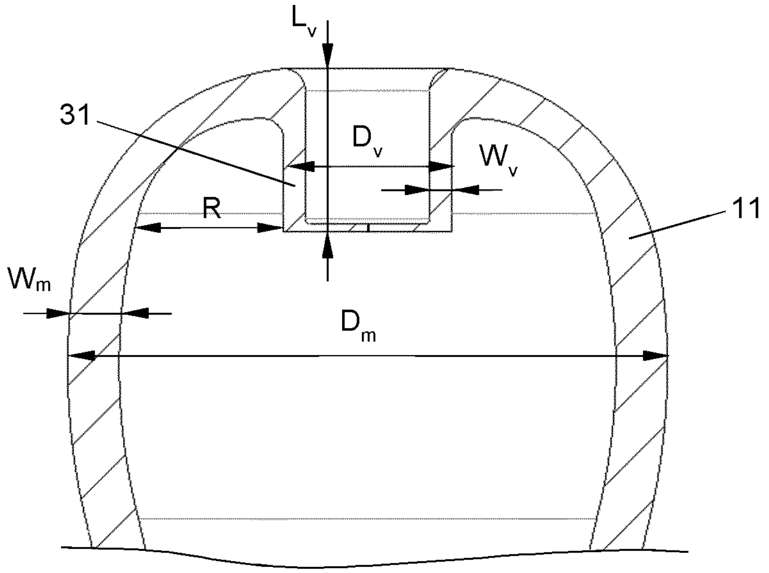
FIG. 4 illustrates how a number of dimensions of the mouthpiece and a valve body extending in the mouthpiece are measured.

FIG. 3 serves to illustrate what the deformation of the mouthpiece 11 following from operational compression forces may look like, showing an outline of the mouthpiece 11 in a default, unloaded shape at the left side of the figure, and an outline of the mouthpiece 11 in a deformed shape at the right side of the figure.

The extent to which the mouthpiece 11 is normally deformed may be taken as a basic assumption in determining suitable dimensional features of the entirety of the mouthpiece 11 and the cup-shaped valve body 31 including the normally-closed valve 30, in addition to or as an alternative to the concept of realizing an effective stiffness difference as mentioned earlier. For example, a minimum radial distance R between at least the bottom 33 of the cup-shaped valve body 31 and an inside surface 14 of the mouthpiece 11 may be defined. In view of what is known in the field of teats designed for feeding infants about how the mouthpiece 11 may be deformed, a suitable value of such minimum radial distance R may be chosen so as to be 3 mm. In this respect, with reference to FIG. 4, it is noted that a non-limiting, practical example of dimensions associated with the mouthpiece 11, when not deformed, is as follows: maximum outside diameter $D_m$ of the mouthpiece 11 about 14 mm, wall thickness $W_m$ of the mouthpiece 11 about 1.2 mm, outside diameter $D_v$ of the cup-shaped valve body 31 about 3.9 mm, wall thickness $W_v$ of the wall portion 34 of the cup-shaped valve body 31 about 0.5 mm, and length $L_v$ of the cup-shaped valve body 31 about 4 mm.

Operation of the teat 1 according to the practical embodiment of the invention will now be described, assuming by way of example that a user of the teat 1 is an infant. In use, the teat 1 is connected to a feeding bottle or the like, as explained earlier. In a default condition, the normally-closed valve 30 is closed, and liquid is prevented to flow out of the teat 1. When it is time for an infant to retrieve liquid from the feeding bottle, the mouthpiece 11 needs to be inserted in his/her mouth. The infant starts a liquid intake action by performing a sucking action and making tongue movements. As soon as the sucking action results in an underpressure of a predefined value higher than a base value needed for keeping the mouthpiece 11 in the mouth, the normally-closed valve 30 is put from the closed condition to the opened condition, so that liquid is allowed to flow from the feeding bottle to the infant's mouth, through the teat 1. In the process, deformation of the mouthpiece 11 takes place, but this aspect of a liquid intake action does not have any significant influence on the condition of the normally-closed valve 30. When the infant wants to swallow the liquid, the underpressure is released at least to such an extent that the normally-closed valve 30 closes. As an advantageous result, the flow of liquid is interrupted as is the case in a natural breast feeding process. When the infant wants to retrieve another quantity of the liquid, he/she acts to increase the value of the underpressure so that the normally-closed valve 30 is put to the opened condition again. Hence, on the basis using the normally-closed valve 30 and having measures aimed at minimizing/eliminating an influence of operational deformation of the mouthpiece 11 on the closed-opened condition of the normally-closed valve 30, a stop-go functionality is obtained that is comparable to how a flow of liquid is controlled during breast feeding. Further, the infant is not hindered in any way in performing the natural peristaltic tongue movement, so that the infant's ability to perform such movement is not lost.

Figure 5:
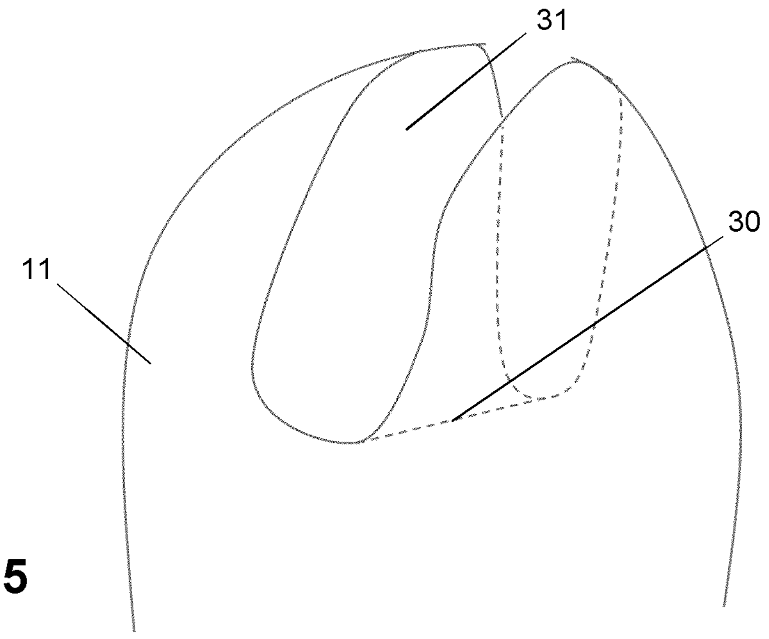
FIG. 5 diagrammatically shows basic features of an alternative design of the teat according to the invention.

In case the cup-shaped valve body 31 is designed so as to form a recess in the mouthpiece 11, it is not necessary for the cup-shaped valve body 31 to be provided as some kind of tube-like member. For example, as shown in FIG. 5, the mouthpiece 11 may come with a simple notch in a top portion thereof, the normally-closed valve 30 being provided as a linear slit at a bottom of the notch, and the cup-shaped valve body 31 being defined by the walls of the notch.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the words "comprising" and "including" do not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Milk is a practical example of liquid that may be taken in by an infant through the teat 1. For the sake of completeness, it is noted that this should not be understood so as to mean that the use of the teat 1 is restricted to this particular type of liquid. Other examples of liquid that may be supplied to a user by means of the teat 1 are water, porridge-like liquid, and medicinal liquid. Further, it is noted that use of the teat 1 according to the invention is not restricted to use by an infant for performing a liquid intake action, even though infants may be the intended users of the teat 1 and the exemplary dimensions of the teat 1 mentioned in the foregoing are related to average anatomical dimensions of the oral cavity and tongue of infants and all particulars of the invention presented in the present text including the claims are applicable to a situation in which the teat 1 is designed for use by infants and in which an assumption is made of normal operational deformation of the mouthpiece 11 associated with such use. The term "infants" is to be understood so as to cover babies and very young children, i.e. children which are normally breast-fed and/or bottle-ted.

Notable aspects of the invention can be summarized as follows. A teat 1 is designed for use with a container for containing liquid and comprises a teat body 10, which may be hollow, including the mouthpiece 11, which may be deformable, fora user of the teat 1 to suck on during a liquid intake action for the purpose of displacing liquid in a downstream direction through the teat body 10 and out of the teat 1 through the mouthpiece 11. The teat 1 is further provided with a normally-closed valve 30 arranged at a level that may be a level of a bottom end of the mouthpiece 11 or a level more downstream, the normally-closed valve 30 being openable under the influence of suction forces exerted to the mouthpiece 11 by a user of the teat 1 during a liquid intake action. The normally-closed valve 30 is included in a valve area 32 of the cup-shaped valve body 31 that is configured and arranged to prevent a closed-opened condition of the normally-closed valve 30 from being changed under the influence of deformation of the mouthpiece 11 inflicted by a user of the teat 1 during a liquid intake action. In that way, it is achieved that the closed-opened condition of the normally-closed valve 30 is controllable by means of suction forces exerted to the mouthpiece 11 by a user of the teat 1 during a liquid intake action, so that a stop-go functionality of the teat 1 is obtained that helps in simulating breast feeding characteristics by means of the teat 1.

The invention claimed is:

1. A teat for use with a container for containing liquid, the teat comprising:

a hollow teat body including a deformable hollow mouthpiece for a user of the teat to suck on during a liquid intake action to displace liquid in a downstream direction through the teat body and out of the teat through the mouthpiece; and a normally-closed valve arranged at a level of the mouthpiece, the normally-closed valve being adapted to open under an influence of suction forces exerted to the mouthpiece by the user of the teat during the liquid intake action, and the normally-closed valve being included in a valve area of a valve body that is configured and arranged to prevent the normally-closed valve from being opened under the influence of compression forces on the mouthpiece inflicted by the user of the teat during the liquid intake action, wherein: positioning and dimensioning of the valve body provide a radial distance (R) between an outer wall of the valve body and an inside surface of the mouthpiece that is sufficient to substantially prevent the compression forces on an outer wall of the mouthpiece from causing contact between the inside surface of the mouthpiece and the outer wall of the valve body; the normally-closed valve is recessed from a top end of the mouthpiece and disposed within the mouthpiece; and the valve body is cup-shaped and has a bottom and a wall portion, and wherein the valve body extends in an upstream direction in the mouthpiece from the top end thereof, the bottom of the valve body being located at a most upstream level in the mouthpiece and the valve area being located in the bottom.

2. The teat according to claim 1, wherein the compression of the mouthpiece is caused by a tongue of the user.

3. The teat according to claim 1, wherein the valve body is configured and arranged to prevent direct deforming influence on the valve area by the compression forces exerted to the mouthpiece by the user of the teat during the liquid intake action.

4. The teat according to claim 1, wherein the valve body comprises a transitional area, and wherein the transitional area is configured to prevent or at least hinder, transmittal of compression forces exerted to the mouthpiece by the user of the teat during the liquid intake action from the mouthpiece to the valve body and wherein the valve body has a stiffness that is different from a stiffness of the mouthpiece, at least at a position of the transitional area.

5. The teat according to claim 1, wherein the valve body is configured to prevent or at least hinder transmittal of compression forces exerted to the mouthpiece by the user of the teat during h liquid intake action from a part of the valve body outside of the valve area to the valve area, and wherein the valve body comprises at least two portions of different stiffnesses.

6. The teat according to claim 5, wherein one of the portions includes the valve area.

7. The teat according to claim 1, wherein the valve body is positioned so that compression of the mouthpiece by the user does not result in the mouthpiece pressing on the valve body in such a way that the valve is put from a closed condition to an opened condition during the liquid intake action.

8. The teat according to claim 7, wherein the radial distance (R) between the valve body and the inside surface of the mouthpiece being at least 3 mm.

9. The teat according to claim 1, wherein the normally-closed valve is located at a level that is further upstream than the top end of the mouthpiece.

10. The teat according to claim 1, wherein the mouthpiece and the valve body constitute an integral entirety.

11. The teat according to claim 1, wherein the valve body is hollow and extends in an upstream direction in the mouthpiece from the top end thereof, a volume of the valve body being smaller than 0.1 ml.

12. The teat according to claim 1, wherein the wall portion of the valve body is generally tube-shaped, and wherein, along at least a portion of the valve body, a total of i) an outside radius of the wall portion of the valve body and ii) 1.7 times a wall thickness ($W_m$) of the mouthpiece at the level where the outside radius of the valve body (31) is considered is smaller than 4 mm.

13. The teat according to claim 1, wherein the wall portion of the valve body is generally tube-shaped, and wherein a ratio between i) an outside radius of the wall portion of the valve body and ii) an inside radius of the mouthpiece at the level of the normally-closed valve is smaller than 0.54.

14. The teat according to claim 1, wherein the wall portion of the valve body is generally tube-shaped, and wherein a ratio between i) a length ($L_v$) of the valve body and ii) an outside diameter ($D_v$) of the wall portion of the valve body is larger than 0.7.

15. The teat according to claim 1, wherein the normally-closed valve comprises a Y-shaped slit.

* * * * *